(12) United States Patent
Ehrmann

(10) Patent No.: US 8,051,630 B2
(45) Date of Patent: Nov. 8, 2011

(54) DEVICE FOR SHRINKING PACKAGINGS

(75) Inventor: Elmar Eugen Ehrmann, Bad Groenenbach (DE)

(73) Assignee: Multivac Sepp Haggenmueller GmbH & Co. KG (DE)

( * ) Notice: Subject to any disclaimer, the term of this patent is extended or adjusted under 35 U.S.C. 154(b) by 515 days.

(21) Appl. No.: 11/918,716

(22) PCT Filed: Apr. 19, 2006

(86) PCT No.: PCT/DE2006/000687
§ 371 (c)(1),
(2), (4) Date: Jul. 15, 2008

(87) PCT Pub. No.: WO2006/111148
PCT Pub. Date: Oct. 26, 2006

(65) Prior Publication Data
US 2009/0071107 A1    Mar. 19, 2009

(30) Foreign Application Priority Data
Apr. 19, 2005   (DE) .......................... 10 2005 018 252

(51) Int. Cl.
B65B 53/02    (2006.01)
(52) U.S. Cl. ........................................... 53/557; 53/442
(58) Field of Classification Search ................... 53/441, 53/442, 556, 557
See application file for complete search history.

(56) References Cited

U.S. PATENT DOCUMENTS

| | | | |
|---|---|---|---|
| 2,691,956 A | | 10/1954 | Ine |
| 3,678,244 A | * | 7/1972 | Worline ........................ 219/388 |
| 3,978,874 A | | 9/1976 | Schmidt, Sr. et al. |
| 4,204,379 A | * | 5/1980 | Mugnai et al. ................... 53/512 |
| 4,597,193 A | * | 7/1986 | Kallfass .......................... 34/224 |
| 4,738,082 A | * | 4/1988 | Saitoh ............................. 53/557 |
| 5,044,142 A | | 9/1991 | Gianelli |
| 5,062,217 A | * | 11/1991 | Tolson ............................ 34/443 |
| 5,193,290 A | * | 3/1993 | Tolson ............................ 34/380 |
| 5,400,570 A | * | 3/1995 | Bennett .......................... 53/442 |
| 5,699,650 A | * | 12/1997 | Gray ............................... 53/442 |
| 5,740,659 A | * | 4/1998 | Cox et al. ........................ 53/442 |
| 5,899,048 A | | 5/1999 | Havens et al. |

FOREIGN PATENT DOCUMENTS

| | | |
|---|---|---|
| DE | 623 379 | 12/1960 |
| DE | 32 15 436 C2 | 11/1983 |
| DE | 33 18 993 A1 | 11/1984 |
| DE | 36 00 585 | 7/1987 |
| DE | 39 24 871 C2 | 2/1991 |
| GB | 1002980 | 9/1965 |

(Continued)

OTHER PUBLICATIONS

Opposition—Opponent: Sealed Air S.r.I., Dated Jun. 10, 2010, Proprietor: Multivac Sepp Haggenmueller GmbH & Co KG, Patent No. EP 1 871 673 B1.

Opposition—Opponent: Supervac Ges. m.b.H., Dated Jun. 16, 2010, Applicant: Multivac Sepp Haggenmueller GmbH & Co. KG, Paten No. EP 1 871 673 B1.

(Continued)

*Primary Examiner* — Paul Durand
(74) *Attorney, Agent, or Firm* — Brooks Kushman P.C.

(57) ABSTRACT

A device is provided for shrinking shrinkable packages by heating by utilizing a liquid and/or gaseous heating medium, which reduces the amount of energy required. The novel device and method achieves its advantages by recovering heat by a recirculation apparatus (8, 9) for recovering heating medium which has evaporated from the liquid heating medium. The method relates to an operational process utilizing such a device.

21 Claims, 4 Drawing Sheets

FOREIGN PATENT DOCUMENTS

Figure 1:
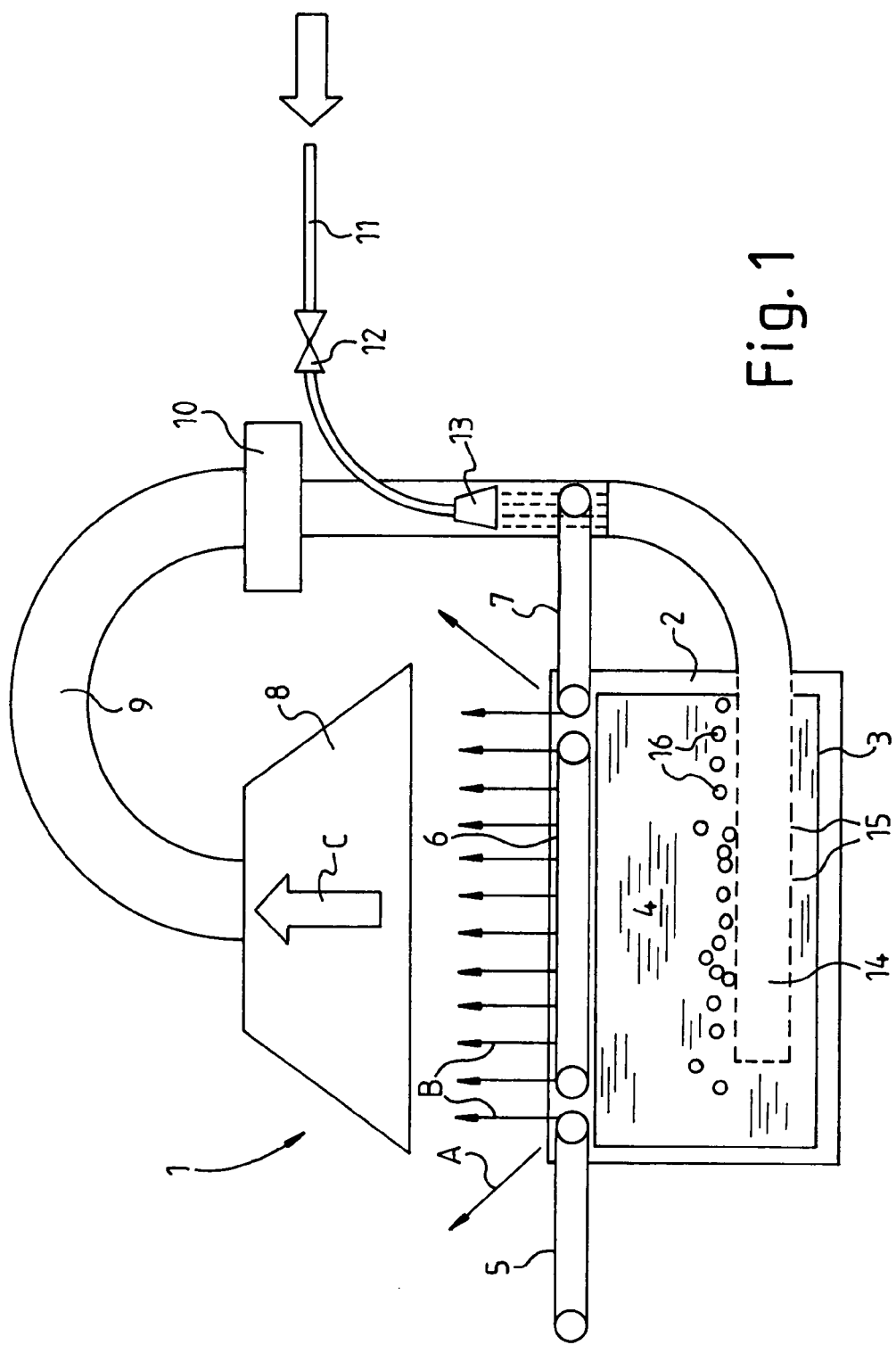

| | | |
|---|---|---|
| GB | 2 119 341 A | 11/1983 |
| JP | 3-226431 A | 10/1991 |
| JP | 9-95320 A | 4/1997 |
| JP | 2002-5582 A | 1/2002 |
| WO | WO 98/57856 | 6/1998 |

OTHER PUBLICATIONS

A Book "Rationelle Energienutzung in der Kunststoff verarbeitenden Industre"—Dated Jul. 2002, Anlage 1-3.

* cited by examiner

DEVICE FOR SHRINKING PACKAGINGS

CROSS REFERENCE TO RELATED APPLICATIONS

Not applicable.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

REFERENCE TO A "MICROFICHE APPENDIX"

Not applicable.

BACKGROUND OF THE INVENTION (1) Field of the Invention

The invention relates to a device and a method for shrinking packages by having a liquid and/or vaporous heating device on a packaging machine and using a liquid and/or vaporous heating medium with a packaging machine. More particularly, the invention relates to a packaging machine having a recirculation apparatus for recirculating a heating medium and a process for recirculating a heating medium for a packaging machine.

(2) Description of Related Art Including Information Disclosed under 37 C.F.R. 1.97 and 1.98

In order to package items in packages with largely form closure, it is customary to package, for example weld in, the items in shrinkable packaging materials, for example shrinkable plastic films. The packaging is then made to shrink by heating so that the packaging contracts around the packaged items. To do this, in commercially available packaging machines so-called shrinking tunnels or shrinking tanks are used in which water is heated. The packages with the packaging which is to be shrunk on are wetted here with hot water. The continuous generation of vapor results in a large amount of energy being required in such devices.

BRIEF SUMMARY OF THE INVENTION

The object of the invention is therefore to provide a device and a method which require a smaller amount of energy in a packaging machine having a liquid, and/or vaporous heating medium or providing a process requiring less energy in a packaging machine having a liquid and/or vaporous heating medium.

The advantages of the invention are achieved with a device and a method of having a recirculation apparatus for recirculating a heating medium and a process for recirculating a heating medium in a device for shrinking shrinkable packages by heating using a liquid and/or vaporous heating medium.

Advantageous embodiments and the advantages of the invention are achieved in having an extraction device in a recirculation apparatus, having an outlet for the recirculated heating medium in the liquid and/or vaporous heating medium, having openings at the entry and/or exit for items to be packaged, having a distributor unit for the recirculated heating medium, having a condensation unit in the recirculation apparatus, having a condensation unit arranged in the liquid heating unit, having a condensation unit with surface enlarging structures, having a housing with a heating trough filled with the liquid heating medium, having a heater in the heating trough, providing a heat exchanger having a heat exchanger arranged in a supplementary container with an inflow for fresh heating medium, utilizing water as the heating medium, providing a thermal contact of packaging with a vaporous and/or liquid heating medium, providing an adjustable thermal contact time, having the adjustable thermal contact time adjusted by the transportation time or rate of movement of the packages, having separating elements which permit packages to be shrunk to be input or removed, having separating elements or separating elements as curtains, having a transportation belt that extends through the working space, having one or more partitioning elements arranged between an upper strand and a lower strand of the transportation belt, having an extraction duct for extracting heat that has escaped from the working space and feeding it to a heat recovery device and employing a method of recovering heat in a packaging machine having a liquid and/or vaporous heating medium utilizing one or more of the foregoing devices.

Accordingly, a device according to the invention is distinguished by the fact that there is provision for heat to be recovered by means of a recirculation apparatus for recirculating heating medium which has evaporated out of the liquid heating medium. The corresponding method according to the invention is distinguished by the use of such apparatuses.

The thermal energy which has been output into the surroundings and is contained in the evaporated heating medium is recirculated at least partially into the device according to the invention by the recirculation apparatus so that the amount of energy required for heating in said device can be significantly reduced. In this context, in particular use is made of the fact that a considerable quantity of energy is contained in the evaporation heat which is taken up by the heating medium at the transition from the liquid phase into the vaporous phase, and said quantity of energy has previously been discharged in such apparatuses without being used. The invention accordingly makes use of the energy which is taken up by the evaporated heating medium as a result of the change of phase.

In one specific embodiment of the invention, the recirculation apparatus comprises an extraction device for the evaporated heating medium. By means of such an extraction device the evaporated heating medium can be collected and used for the recovery of the evaporation heat according to the invention. Previously, such extraction devices were always only used to collect evaporated heating medium and discharge it into the open air.

The extraction device is preferably arranged in the region of the openings in the shrinking device, for example at the inlet and/or at the outlet for inputting or removing, in particular above these openings, so that only the vapor which would otherwise risk escaping and would thus lead to a loss of energy penetrates the recirculation apparatus.

In one particular embodiment of the invention, one or more separating elements are provided in the region of the inlet and/or the outlet in order to limit the energy losses. Such separating elements can be present, for example, in the form of curtains by means of which the packages to be shrunk can easily be introduced into the device according to the invention and removed again.

In one development of this embodiment, the recirculation of the heating medium is configured in such a way that there is provision for the heating medium, in particular water vapor, to be extracted between two such separating elements.

In order to form a defined flow in this context it may be advantageous to suck in air from the outside together with the extracted heating medium in order to generate a sufficient volume flow.

A distributor unit is preferably provided for the heating medium to be recirculated so that the recirculated heating medium can be appropriately distributed with the associated inputting of energy into a liquid heating medium over a large area. Furthermore, when gaseous heating medium is introduced the distributor unit ensures that the introduction into a liquid heating medium occurs in the form of finely distributed bubbles which can largely dissipate in the liquid heating medium through condensation before they arrive at the surface. The condensation heat which is released is fed back into the liquid heating medium in a further change of phase.

The distributor unit is preferably arranged in the liquid heating medium so that the recirculated heating medium is output directly through the distributor unit.

In another embodiment of the invention, the recirculation apparatus advantageously comprises a condensation unit. By using such a condensation unit vaporous heating medium is extracted for the purpose of recovering heat to be changed to the liquid phase so that it can be added to the existing supply of liquid heating medium without forming vapor bubbles.

In one particular embodiment, the condensation unit is also arranged in the liquid heating medium of the device, as a result of which on the one hand the addition of condensed, recovered liquid heating medium is simplified and on the other hand the condensation heat can be transferred directly into the liquid heating medium.

In order to improve this function, in a further particular embodiment the condensation unit is provided with a distributor unit which comprises surface enlarging structures. In one particularly simple embodiment, a commercially available cooler is used as a condensation unit. Such coolers are usually also provided with surface enlarging structures in order to produce a large thermal contact surface. A better exchange of heat can take place by means of such surface enlargements.

In one development of the invention, a separating unit is also provided for separating air which is entrained in the recirculation from the liquid and/or vaporous heating medium. Such a separating unit can, for example, take the form of a smoothing tank after the change into the liquid phase by virtue of the fact that the air contained in the recirculated vapor can be separated off at the top after condensation has occurred.

A further embodiment consists in a collection hood, under which the entrained air in the liquid heating medium can collect, being provided above the inlet of the recirculated heating medium into the liquid heating medium. By a corresponding configuration, for example by an oblique arrangement or attachment of an extraction pipe, the air which is collected in this way can be discharged outwards.

In order to recirculate the vaporous, recovered heating medium, the distributor unit and/or the condensation unit are advantageously connected to the extraction device, for example by means of a pipeline.

In order to compensate for losses of liquid heating medium, a feed line is advantageously provided for feeding in fresh liquid heating medium. In one particular development of this embodiment of the invention, fresh heating medium is fed in within the recirculation line so that as a result of fresh, cool and liquid heating medium being fed in the recirculated vapor is made to at least partially condense and at the same time its thermal energy is used to preheat the freshly fed in heating medium. In a further advantageous development of this embodiment, a spray head is provided in the interior of the recirculation means in order to ensure a large contact area between the fed in, fresh heating medium and the recirculated heating vapor.

Another embodiment provides for water to be fed in to a supplementary container which is advantageously used at the same time as a smoothing tank.

The heating medium can be fed back directly in a circulating fashion in order to use the energy contained in it. In another embodiment, the recirculated heating medium is fed via a heat exchanger so that only the energy contained in it is re-used as process heat. The latter variant is advantageous in particular if a liquid heating medium is provided, with the recirculated heating medium evaporating, that is to say being gaseous. In this case, when the heating medium is directly recirculated the energy contained in the vapor through condensation is used in the liquid medium, but using a heat exchanger ensures that no turbulences or bubbling effects which could adversely affect the method of functioning of the device occur in the liquid heating medium.

If a heat exchanger is used, it is preferably arranged in the region of the feed for fresh heating medium, for example fresh water, so that the latter is preheated by means of the heat exchanger before it arrives in the region of the heater. For this purpose, the heat exchanger is advantageously arranged in the direction of counterflow to the fed in fresh heating medium. In one particular embodiment, the space for the preheating by means of the heat exchanger is designed with a separation merely by a separating wall with an overflow from the actual reservoir container. This ensures that only the preheated water located above it can pass over the overflow.

In one development of the invention, a transportation belt which extends through the entire device is provided, with partitioning elements which reduce the passage of gaseous heating medium through restricting the free section being accommodated between the upper strand and lower strand.

The device according to the invention is preferably embodied with a housing which contains heating medium.

This corresponds to the proven arrangement of so-called shrinking tanks or shrinking tunnels, it being desirable, for example, to arrange a heating trough which is filled with liquid heating medium in such a housing.

Furthermore, such a heating trough is advantageously provided with a heater for liquid heating medium, which can be implemented, for example, in the form of a heating coil, a heating plate or else in the form of a continuous flow heater.

In particular when a continuous flow heater is used, but also in other forms of heater, an external arrangement outside the heating trough can be implemented.

Such external heaters have the advantage that bubbles which are formed due to direct contact with the corresponding heating surface cannot rise in the heating trough and escape directly as vapor. During the transportation from the external heating device into the heating trough, temperature compensation occurs during which any such vapor bubbles which are formed are changed back at least partially into the liquid phase.

The heaters can be embodied here in particular also as a steam heating means, or else as electrical and/or fossil fuel heaters, possibly with intermediate connection of a heat exchanger in the heating trough. (A heat exchanger provides complete separation of the circulation, which is advantageous, among other things, for hygienic considerations).

Water is preferably used as the heating medium, which is particularly advantageous in the field of food stuffs. On the one hand, water itself is a nutrient and can therefore be safely used for possible wetting of a surface of the package. On the other hand, a germ-free environment can be provided by means of hot water or hot steam. Although this is not absolutely necessary for tightly sealed packaging, it is basically advantageous in the field of food stuffs.

Thermal contact with the packages in order to shrink the packaging can be brought about, for example with the liquid heating medium by virtue of the fact that the packages are dipped into the liquid heating medium for a certain contact time. It is also possible to provide that spraying is carried out via a corresponding spray unit with spray nozzles in order to wet the packages with liquid heating medium.

A further, previously unknown form of carrying out the wetting of packages with shrinkable packaging by means of a hot liquid heating medium, for example water, is to construct one or more fluid curtains, in particular water curtains in the manner of a waterfall. For this purpose, preferably one or more slit nozzles are provided, from which the liquid can emerge in the manner of a curtain and completely wet the packages to be shrunk.

A water curtain such as that specified above can also be implemented, for example, by virtue of the fact that a water channel is provided with an overflow. The water should be fed into the channel as smoothly as possible. The channel accordingly constitutes a type of smoothing zone for the fed in water. The overflow is unpressurized and can take place in the longitudinal direction of the channel here so that an elongated water curtain is produced. In order to give rise to a water curtain which is uninterrupted without ruptures, in one advantageous embodiment the side wall of such a channel is provided with a downward pointing bevel which serves, as it were, as a guiding surface for the water curtain. The feeding in of water into the channel which is mentioned above can be carried out, for example, by means of a perforated pipe which is dipped into the water entirely or partially and is provided with outlet openings below the water line. These water outlet openings can be distributed in the longitudinal direction of the pipe in order to ensure a uniform, smooth supply of water over the entire length of the water channel.

The wetting of the packages by one or more fluid curtains has the advantage over the previously known spraying in that less heating medium evaporates and at the same time more complete wetting of the packages to be shrunk is ensured. To this extent, through this method of wetting energy is saved even without the inventive recirculation of heating medium. This method of wetting therefore constitutes in itself a separate embodiment of the invention which, however, can be combined readily with one or more of the features which can be found in the present description.

In the foregoing embodiment with dipping a transportation device for the packages can be operated in a clocked fashion that is capable of dipping again into the liquid medium while the package is present in the heating chamber together with other packages and of pulling the package or packages out again after a suitable dwell time.

However, in other embodiments it is also desirable to implement shrinking in thermal contact with a vaporous heating medium, for example by virtue of the fact that the packages are introduced into the vapor atmosphere above the liquid heating medium in order to shrink the packaging. Mixed forms, i.e. simultaneous contact with liquid and vaporous heating medium are readily conceivable. During the spraying process, the development of large amounts of steam can, for example, bring about such contact with liquid and gaseous heating medium.

The contact time for the thermal contact is preferably made adjustable, which can be realized, for example, by means of an adjustable transportation time of the package through the heating medium or an adjustable dipping time.

In order to transport the packages by means of the device according to the invention, one or more transportation belts and/or roller paths are preferably provided. This makes continuous operation possible. Furthermore, in the case of a transportation belt the contact period with the heating medium can be made adjustable by means of the transportation speed. In this way a sufficient shrinking process for different packaging is ensured.

BRIEF DESCRIPTION OF THE SEVERAL VIEWS OF THE DRAWING(S)

Figure 2:
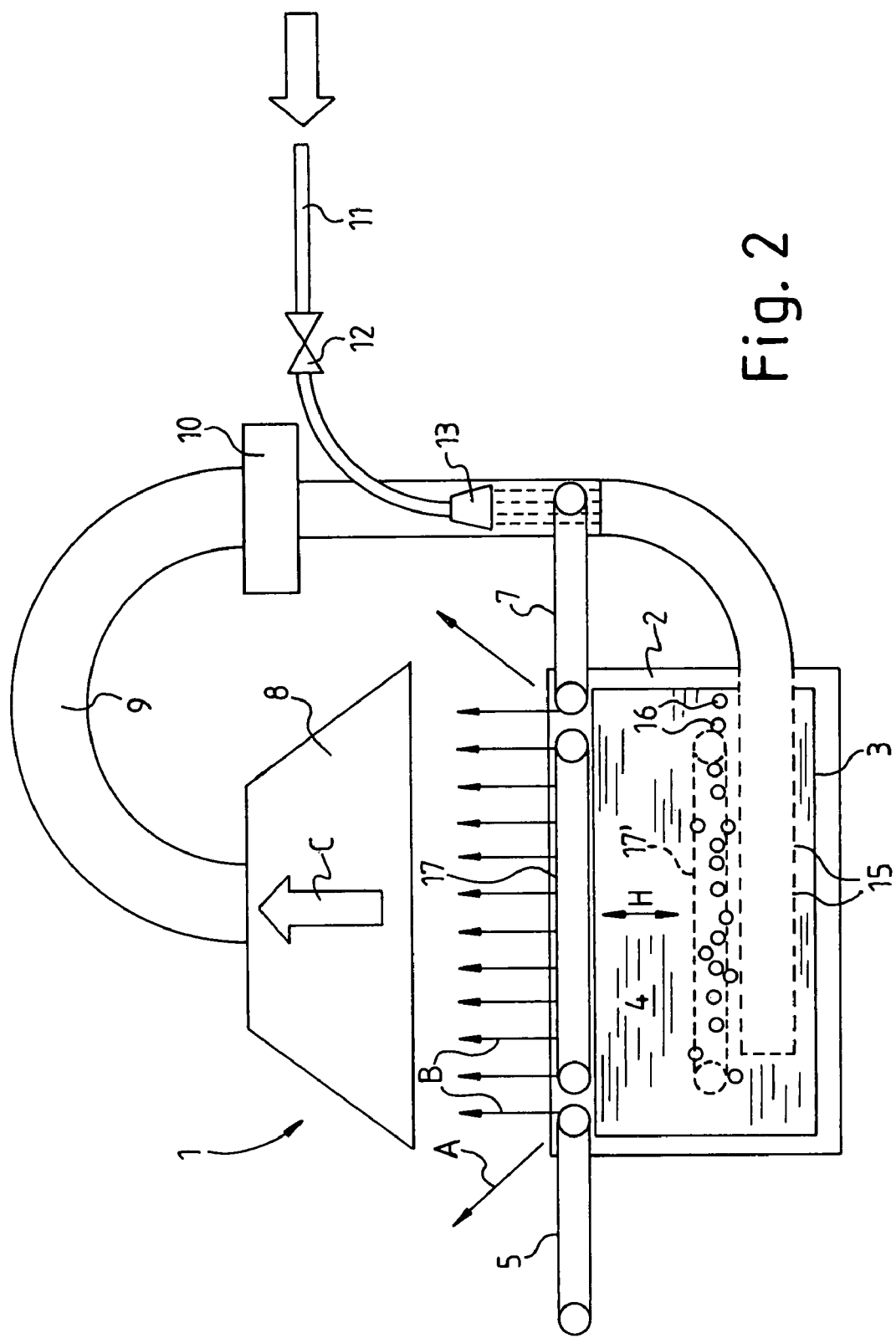
Figure 3:
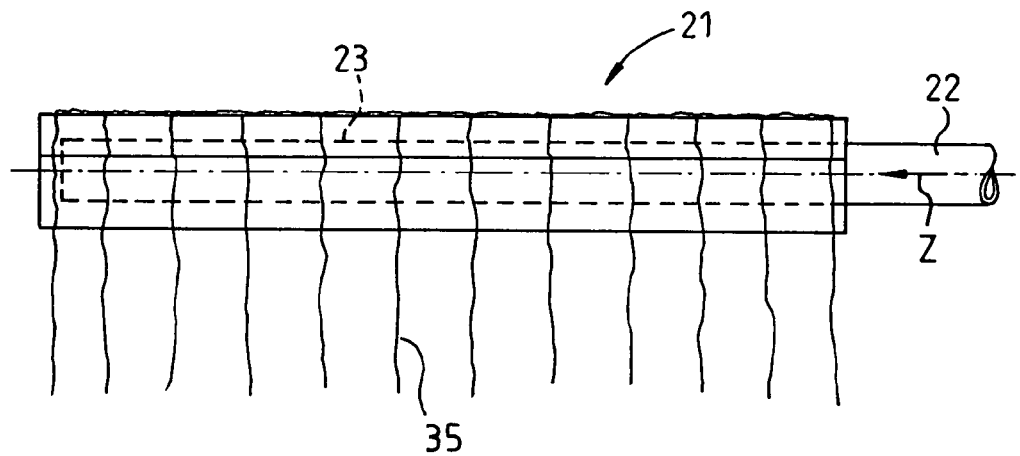
Figure 4:
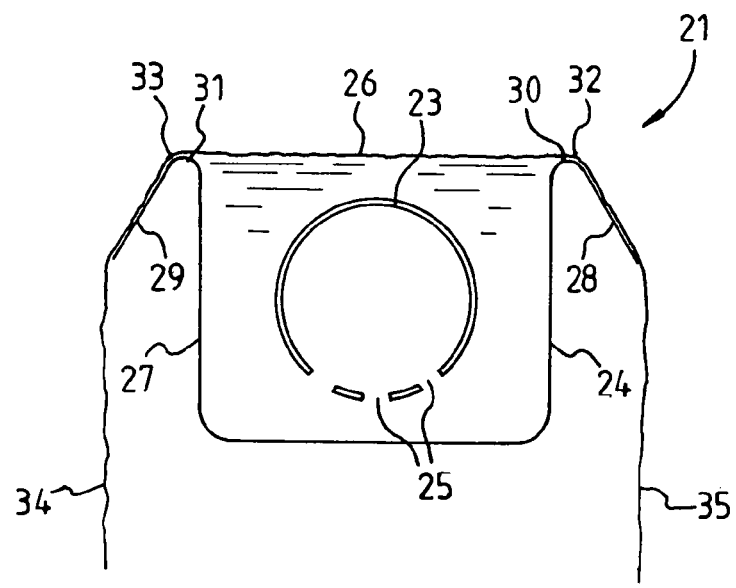
Figure 5:
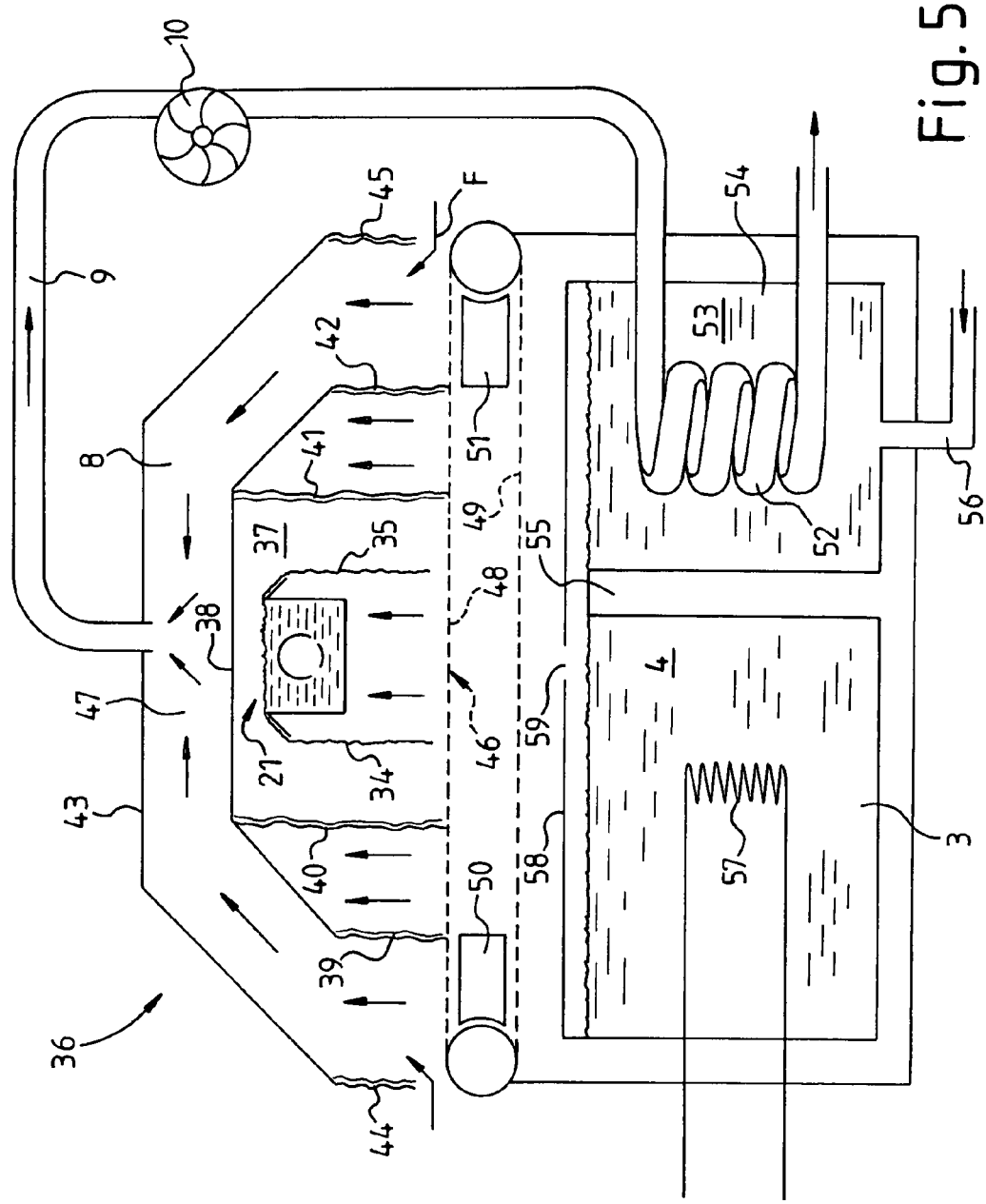

An exemplary embodiment of the invention is illustrated in the drawing and will be explained in more detail below with reference to the figures, of which, in particular, FIG. 1 is a schematic sectional illustration through a first embodiment variant of the invention, FIG. 2 is an illustration similar to FIG. 1 of a second exemplary embodiment, FIG. 3 is a schematic side view of a device for producing a water curtain, FIG. 4 is a schematic cross section through a device according to FIG. 3, and FIG. 5 is an illustration, similar to FIG. 1, of a further embodiment of the invention.

DETAILED DESCRIPTION OF THE INVENTION INCLUDING BEST MODE

FIG. 1 shows a device 1 according to the invention for shrinking packages. The device 1 comprises a housing 2 with a heating trough 3 in which water 4 is heated. Four transportation belts 5, 6, 7 which serve to feed in and transport away packages (not illustrated in more detail) with shrinkable packaging are located above the water level.

Alternatively, other transportation devices, for example roller paths can be provided for feeding in and transporting away packages. In the case of roller paths it is advantageous, for example, to use lifting devices which are arranged on one side in order to move the roller paths into an oblique position and thus bring about a transportation movement of the packages.

An extractor hood 8, which is connected to the heating trough 3 via a recirculation line 9, is illustrated above the transportation belts 5, 6, 7. A fan 10 ensures here that the desired flow occurs in the interior of the recirculation line 9.

A fresh water line 11 is made to extend into the interior of the recirculation line 9 via a check valve 12. By means of a spray head 13 fresh water is sprayed into the hot steam located in the recirculation line 9. In this case the fresh water is pre-heated, while at the same time the hot steam condenses.

The recirculation line 9 is provided with a perforated end piece 14 which serves as a distributor unit. The fed back heating medium, i.e. water in this case, can escape into the heating trough 3 through a large number of small openings 15. This procedure is also realized by means of small bubbles 16 of vapor.

As a result of the distribution of the recirculated water vapor by means of the perforated end piece 14 in the water of the heating trough 3 this vapor condenses quickly in thermal contact with the water 4. The temperature of the water 4 which is selected is preferably between 80° C. and 95° C. This temperature range has proven advantageous for the desired shrinking process.

Even at this temperature, a considerable quantity of water vapor still escapes upwards, as is illustrated by the arrows A, B. Part of this water vapor escapes to the side of the extractor hood 8, as is illustrated by means of the arrow A. However, a significant proportion of this water vapor (cf. arrow B) passes into the recirculation line 9 via the extractor hood 8, as is indicated by arrow C.

Packages (not illustrated in more detail) pass via the transportation belt 5 to the central transportation belt 6. There, they are subjected to the desired shrinking process. During this process the packages are sprayed with heated water 4 by means of a corresponding spray unit (not illustrated in more detail). However, the shrinking process is also possible in the vapor atmosphere above the heated water 4.

The water vapor which escapes upwards is extracted by means of the fan 10 and returned to the heating trough 3 by means of the recirculation line 9, in which heating trough 3 it escapes through the opening 15 in the perforated end piece 14. The loss of water which occurs due to laterally escaping vapor (cf. arrow A), is either replenished continuously or in a clocked fashion by activating the check valve 12. For continuous operation, the check valve 12 must have a metering function at the same time.

After the shrinking process, the finished packages are carried away by means of the transportation belt 7, while at the same time new packages with packaging which is still to be shrunk on can be fed via the transportation belt 5.

The embodiment according to FIG. 2 corresponds essentially to the abovementioned exemplary embodiment. The corresponding components therefore also have the same reference symbols. However, in contrast to the abovementioned exemplary embodiment, the central transportation belt 17 can now be lowered so that it can be dipped completely into the water 4 together with the packages (not illustrated in more detail) which are located on it. The transportation belt 17 is shown here by dashed lines in the dipped in position 17' above the perforated end piece 14. After the shrinking process, the transportation belt 17' is lifted up again into the position 17 above the water 4. This lifting movement is illustrated by means of the double arrow H.

The feeding in and carrying away of packages is carried out by means of the transportation belts 5 and 7 as described with reference to the first exemplary embodiment.

In addition to the two exemplary embodiments illustrated, a large number of other embodiments of the invention are available to those skilled in the art. However, the recovery of heat by recirculating the heating medium, in particular in evaporated form, is a characteristic feature of the novel process and devices constructed in accordance with the invention. This measure achieves an enormous saving in energy compared to the previous prior art in which extracted, in particular vaporous, heating medium was discharged into the surroundings without being used.

FIG. 3 shows a longitudinal view of a water channel 21 for producing a water curtain. The inflow line 22 serves to feed in water into the water channel 21 in accordance with the arrow Z.

An inflow pipe 23 is arranged in the interior of the water channel 21 and it extends over a large area in the longitudinal direction of the water channel 21, essentially over the entire length of the water channel 21 in this case. In FIG. 3, the inflow pipe is shown by dashed lines since it is covered by the side wall 24 of the water channel 21. The inflow pipe 23 comprises a plurality of inflow openings 25 which are arranged on the underside of the inflow pipe 23 in the present embodiment variant. The essential factor here is that the inflow openings 25 lie below the water level 26 so that the water can be fed in as quietly and as free of turbulence as possible. The inflow openings 25 can extend over the entire length of the inflow pipe 22 and likewise over its entire circumference.

The side walls 24, 27 of the water channel 21 are provided on the upper side with bevels 28, 29, the respective apex 30, 31 of the bevels 28, 29 forming an overflow 32, 33 for the water 35 which is located in the water channel. The bevels 28, 29 serve, over a certain length, as a guide surface for the overflowing water which, as a result, drops in the downward direction as a water curtain 34, 35 on both sides of the water channel 21. In FIG. 3 the water curtain is illustrated by wavy lines. Since the overflow 32 occurs uniformly over the entire length of the water channel 21, the water curtain 35, like the water curtain 34 located opposite, can be implemented with such a device without interruptions and as an unbroken surface. The water channel 21 serves here as a smoothing vessel for the fed in water. Due to the discharging of the water via the overflow 32 or 33, the water curtain 34 or is formed in an unpressurized fashion.

Such a device for producing a water curtain can also be applied to other liquid heating media. Here, the embodiment was described with reference to water as the heating medium since water is a preferred medium in the field of food stuffs. However, it is generally possible to refer to a fluid channel instead of the water channel 21 and also to a fluid curtain instead of a water curtain 34, 35.

The device 36 according to FIG. 5 differs essentially from the embodiment described above in that a vapor extraction device from the working region is not provided but instead the working region 37 is partitioned off by a lid 38 and separating curtains 39, 40, 41, 42. As a result, a double curtain is formed both on the inlet side, by the separating curtains 39, 40, and on the outlet side, by the separating curtains 41, 42, and said double curtain significantly reduces the quantity of water vapor which emerges from the working space.

An extractor hood 43, which is provided again with a respective separating curtain 44, 45 on the input side and one on the output side is arranged above the lid 38. The separating curtains 44, 45 are arranged here at a certain distance from the transportation belt 46 so that air can enter from the outside through the gap which is formed in this way, as indicated by the arrow F.

The intermediate space between the lid 38 and the extractor hood 43 forms a suction duct 47 via which water vapor which penetrates to the outside from the working region 37 is sucked away and fed to the recirculation line 9. The feeding in of external air which is provided in a selected fashion serves here to form a flow since in this embodiment only very little vapor penetrates the region of the suction duct 47.

In the present embodiment, a respective partitioning element 50, 51 is also arranged between the upper strand 48 and lower strand 49, which partitioning elements 50, 51 reduce the open cross section for the passage of water vapor in the intermediate region between the upper strand 48 and lower strand 49. The transportation belt 46 is of fluid permeable design so that the intermediate space between the upper strand 48 and the lower strand 49 is accessible to water vapor from the working region 37.

In the illustrated embodiment, the recirculated water vapor is fed into a heat exchanger 52 via the recirculation line 9 and the fan 10. In the present embodiment, the water 53 which surrounds the heat exchanger 52 is provided in an additional container 54 which is separated from the heating trough 3 via a separating wall 55. The separating wall 55 forms an overflow so that when fresh water is topped up through the fresh water feed 56, the fresh water is preheated in the supplementary container 54 and passes into the heating trough 3 via the overflow of the separating wall 55. In the illustrated embodiment, the cooled stream of fluid in the recirculation line 9 is discharged into the open air after it has passed through the heat exchanger 52.

A heating spiral 57 is shown in the heating trough which by way of example can be of various types of heating elements. The heating element 57 can also be embodied as a heat exchanger similar to the heat exchanger 52, in order, for example, to use an external steam heating means or other heating fluids. Furthermore, instead of the heating coil 57, all other conceivable heating elements, for example elastic heating plates, heating coils or the like, are possible.

In the illustrated exemplary embodiment, the packages which are to be shrunk are wetted by means of water curtains 34, 35, as has been described with reference to FIG. 4. The feeding into the water channel 21 is brought about here by means of hot water 4 from the heating trough 3 in a way which is not illustrated in more detail.

The water which flows off in the water curtains 34, passes through the transportation belt 46 onto a cover 58 which covers the heating trough 3, and passes back through a passage 59 in the cover 28 to the water 4 which is located in said heating trough 3. The cover 58 can, for this purpose, be provided with a slightly funnel shape which is not shown in FIG. 5 for reasons of illustration.

In the exemplary embodiment according to FIG. 5, there is now a risk of unused discharge from the working region 37 only for a significantly reduced quantity of vapor. This quantity of vapor is extracted via the suction duct 47, the recirculation line 9 using the fan 10, and fed through the heat exchanger 52 in the direction of counterflow to the fresh water from the fresh water feed 56. In the process, the fresh water is pre-heated, while the stream of fluid in the heat exchanger 52 is cooled and is subsequently discharged into the surroundings.

The illustrated embodiment is very energy efficient with respect to the partitioning off of the working space 37 and the recirculation of the energy which is discharged with the proportion of steam which is discharged.

Furthermore, this embodiment is very hygienic since the recirculated stream of fluid is discharged into the exterior again after it has passed through the heat exchanger.

The transportation belt 46 is now formed over the entire width of the device, and the intermediate space between the upper strand and lower strand can be provided with partitioning elements 50, 51. The cross section which is open toward the outside is thus reduced to a minimum, as it is by the separating curtains 39, 40, 41, 42, 44, 45.

The individual measures, which are illustrated in the embodiment according to FIG. 5 and described above, for partitioning off the working space 37 and for recirculating the water vapor which is extracted via the extraction duct 47 and for using its waste heat are not limited to the overall combination of features illustrated in said figure. The number of separating curtains does not necessarily need to be as in the described exemplary embodiment either. Furthermore, separating elements other than the configuration as a curtain are also conceivable.

The utilization of residual heat by means of a heat exchanger can be used to reduce the escaping quantity of vapor independently of the specified partitioning measures.

LIST OF REFERENCE NUMERALS

1 Device
2 Housing
3 Heating trough
4 Water
5 Transportation belt
6 Transportation belt
7 Transportation belt
8 Extractor hood
9 Recirculation line
10 Fan
11 Fresh water line
12 Check valve
13 Spray head
14 End piece
15 Opening
16 Vapor bubble
17 Transportation belt
21 Water channel
22 Inflow line
23 Inflow pipe
24 Side wall
25 Inflow openings
26 Water level
27 Side wall
28 Bevel
29 Bevel
30 Apex
31 Apex
32 Overflow
33 Overflow
34 Water curtain
35 Water curtain
36 Device
37 Working region
38 Lid
39 Separating curtain
40 Separating curtain
41 Separating curtain
42 Separating curtain
43 Extractor hood
44 Separating curtain
45 Separating curtain
46 Transportation belt
47 Suction duct
48 Upper strand
49 Lower strand
50 Partitioning element
51 Partitioning element
52 Heat exchanger
53 Water
54 Supplementary container
55 Separating wall
56 Fresh water feed
57 Heating coil
58 Cover
59 Passage

What is claimed is:

1. A device for shrinking shrinkable packages by heating using a liquid and/or vaporous heating medium, wherein the improvement comprises a recirculation apparatus for recovering heat from a recirculating heating medium which has evaporated from the liquid heating medium, wherein the recirculation apparatus comprises an outlet for the recirculated heating medium disposed in the liquid heating medium, and
wherein the outlet in the liquid heating medium is a distributor unit for the recirculated heating medium.

2. The device as claimed in claim 1 wherein the recirculation apparatus comprises an extraction device for the evaporated heating medium.

3. The device as claimed in claim 2 wherein the extraction device is provided in the region of openings at an entry and/or exit for the items to be packaged.

4. The device as claimed in claim 1 wherein the recirculation apparatus comprises a condensation unit.

5. The device as claimed in claim 4 wherein the condensation unit is arranged in liquid heating medium.

6. The device as claimed in claim 4 wherein the condensation unit has a distributor unit with surface-enlarging structures.

7. The device as claimed in claim 1 wherein the recirculation apparatus comprises a heat exchanger.

8. The device as claimed in claim 7 wherein the heat exchanger is arranged in a supplementary container having an inflow for fresh heating medium.

9. The device as claimed in claim 1 wherein water is provided as the recirculating heating medium.

10. The device as claimed in claim 1 wherein a thermal contact of packaging with the vaporous and/or the liquid heating medium is provided.

11. The device as claimed in claim 10 wherein contact time of the thermal contact is adjustable.

12. The device as claimed in claim 1 further comprising separating elements for permitting packages to be shrunk to be input or removed, wherein the separating elements comprise curtains.

13. The device as claimed in claim 1 further comprising a transportation belt extending through a working space.

14. The device as claimed in claim 13 further comprising one or more partitioning elements disposed in an intermediate space between an upper strand and a lower strand of the transportation belt.

15. The device as claimed in claim 1 wherein the recirculation apparatus includes an extraction duct for extracting heating medium which has escaped from a working space and feeding it to a heat recovery means.

16. The device of claim 1 further comprising a trough that receives the liquid heating medium, wherein the recirculating apparatus comprises an extraction device positioned above the trough for receiving the evaporated heating medium, and a recirculation line connected to the extraction device for routing the evaporated heating medium toward the trough, the recirculation line including the outlet, and wherein the outlet is disposed in the trough.

17. The device of claim 16 wherein the recirculating apparatus further comprises a condensing unit for introducing additional liquid heating medium into the recirculation line so that the additional liquid heating medium may be heated by the evaporated heating medium.

18. The device of claim 1 further comprising a container for receiving liquid heating medium, wherein the recirculation apparatus comprises an extraction device positioned above the container for receiving the evaporated heating medium, a recirculation line connected to the extraction device for routing the evaporated heating medium toward the container, and a heat exchanger connected to the recirculation line and disposed in the container for transferring heat from the evaporated heating medium to the liquid heating medium received in the container.

19. The device of claim 1 wherein the distributor unit has multiple openings disposed in the liquid heating medium.

20. The device of claim 1 further comprising a water channel for producing a water curtain for wetting the packages.

21. The device of claim 20 wherein the water channel is configured to extend above the packages and has first and second sides over which water travels to produce the water curtain on both sides of the water channel.

* * * * *